(12) United States Patent
Peacock et al.

(10) Patent No.: US 6,394,140 B1
(45) Date of Patent: May 28, 2002

(54) GASKET

(75) Inventors: Briton N. Peacock, Rotheram; Paul Summerfield, Oakham, both of (GB)

(73) Assignee: Corus UK Limited (GB)

( * ) Notice: Subject to any disclaimer, the term of this patent is extended or adjusted under 35 U.S.C. 154(b) by 0 days.

(21) Appl. No.: 09/762,826

(22) PCT Filed: Aug. 13, 1999

(86) PCT No.: PCT/GB99/02555

§ 371 (c)(1),
(2), (4) Date: Jun. 5, 2001

(87) PCT Pub. No.: WO00/09926

PCT Pub. Date: Feb. 24, 2000

(30) Foreign Application Priority Data

Aug. 14, 1998 (GB) ................................. 9817690

(51) Int. Cl.[7] ................................. F16L 21/04
(52) U.S. Cl. ...................... 138/112; 113/108
(58) Field of Search .................. 138/113, 112, 138/114, 108; 277/621

(56) References Cited

U.S. PATENT DOCUMENTS

| | | | | |
|---|---|---|---|---|
| 2,258,135 A | * | 10/1941 | Curtis | .................... 138/113 X |
| 3,406,748 A | * | 10/1968 | Jarreby | .................... 138/113 X |
| 3,899,007 A | * | 8/1975 | Miller | .................... 138/114 |
| 3,964,754 A | * | 6/1976 | Murai et al. | .................... 138/108 X |
| 4,124,040 A | * | 11/1978 | Miller | .................... 138/148 |
| 5,860,453 A | * | 1/1999 | Picking | .................... 138/112 |
| 6,305,429 B1 | | 10/2001 | Welch et al. | .................... 138/149 |

OTHER PUBLICATIONS

PCT WO 00/09926 Peacock Aug. 13, 1999.*
UK Patent Application GB. 2,318,400 Welch et al. Apr. 1998.*
UK Patent Application GB 2,317,934 Hepburn Apr. 1998.*

* cited by examiner

Primary Examiner—Patrick Brinson
(74) Attorney, Agent, or Firm—Blank Rome LLP

(57) ABSTRACT

A gasket for noting an annular space between two pipes comprises an annular elastomeric member (10) having a concave formation on at least one longitudinal end face, compression members (20, 22) adjacent the longitudinal end faces and connected via a plurality of securing means (30) adapted to urge the compression members (20, 22) together, the compression member or members (20, 22) adjacent a concave formation on the elastomeric member (10) including a corresponding convex formation. The elastomeric member (10) can also include a concave formation on at least one radial face (12, 14), in which the gasket can further include at least one (preferably elastomeric) filler member in that concave formation, on the radial (12, 14).

16 Claims, 3 Drawing Sheets

GASKET

FIELD OF THE INVENTION

The present invention relates to a gasket for use in sealing an annular space between two pipes.

BACKGROUND OF THE INVENTION

This is a problem which is commonly encountered in the offshore oil and gas industry. Crude oil typically emerges from undersea fields at between 100 and 100° C. This crude oil will include low melting point fractions which will solidify within the pipe if the oil it allowed to cool to the temperature of the surrounding water. Therefore, it is necessary to insulate the pipe. This is usually done by providing a double-walled pipe structure in which an inner flow pipe carries the crude oil and an outer sleeve pipe so as to define an annular space external to the inner flow pipe. This annular space is then filled with suitable insulating material.

It is necessary to guard against ingress of water into the annular space. Clearly, if water is allowed into the annular space it will conduct heat from the inner flow pipe to the outer sleeve pipe and destroy the effectiveness of the insulation. Any such accidental water leakages therefore need to be limited to short lengths of pipe. There is therefore a requirement for waterstop gasket to seal the annular region. Such gaskets are typically inserted at intervals of 12 m, or so. Our earlier application published as WO 96/36831 describes a gasket comprising an annular ring of elastomeric material with flat compression members either side. The compression members are drawn together using bolts, and this compresses the elastomeric member longitudinally. The resulting radial expansion seals against the flow pipe and sleeve pipe. This waterstop gasket is suitable for double-walled pipe structures in which the annular gap is approximately 100 mm. There is a requirement for a waterstop for use with double-walled pipe systems in which the annular gap is approximately 50 mm. In these situations, the design of WO 96/36831 can sometimes provide insufficient sealing w hen scaled down approximately.

SUMMARY OF THE INVENTION

The present invention therefore provides a gasket for sealing an annular space between two pipes, comprising an annular elastomeric member having a concave formation on at least one longitudinal end face, compression members adjacent the longitudinal end faces and connected via a plurality of securing means adapted to urge the compression members together, the compression member or members adjacent a concave formation on the elastomeric member including a corresponding convex formation.

Preferably, the elastomeric member is unitary, but it is possible to design a suitable gasket in which the elastomeric member is made up of several components.

The elastomeric member can also include a concave formation on at least one radial face. In that case, the gasket can further include at least one filler member in that concave formation, on the radial face. The filler member is preferably elastomeric.

The securing means preferably comprise threaded members passing through at least one of the compression members and through the elastomeric member. These can be bolts, either passing through both compression members and retained by a suitable nut, or (preferably) extending into an internally threaded blind hole on one of the compression members. This eliminates a leakage path adjacent the bolt.

Alternatively, the threaded members can be in the form of studding, secured at one or both ends (as before) with a suitable nut.

The compression members are preferably steel.

The steel compression members can each be unitary, ie in the form of a ring, or they can be divided into a plurality of individual arcuate members. Such division of the compression members gives rise to the advantages set out in WO 96/36831. If the compression numbers are divided, individual arcuate portions on either side of the elastomeric member are preferably staggered.

A more secure seal can be obtained within the narrow confines to which the present invention relates by ensuring that the aspect ratio of the elastomeric member when uncompressed is greater than 6 and/or that the included angle of the concave section thereof is less than 45°. If the aspect ration is above 10, the design can become unwieldy, so this is a preferable upper limit. Likewise, an included angle of greater than 30° is desirable. A suitable aspect ration is about 6.8 and a suitable angle is about 38°.

BRIEF DESCRIPTION OF DRAWINGS

Embodiments of the present invention will now be described, by way of example, with reference to the accompanying Figures, in which.

DETAILED DESCRIPTION OF THE EXAMPLES

Figure 1:
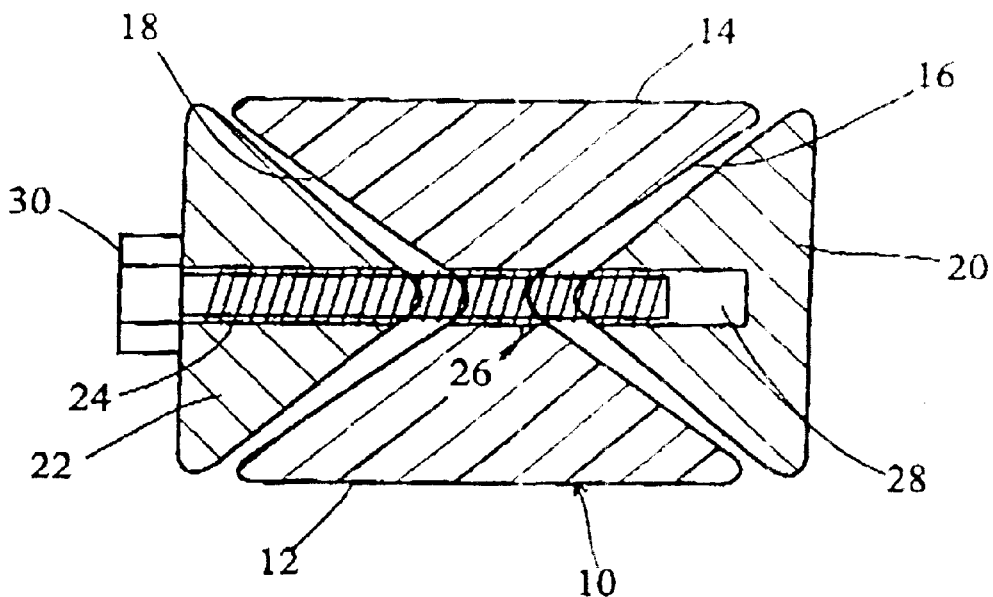
FIG. 1 is a cross-section through a first embodiment of the present invention.

Referring to FIG. 1, this shows an elastomeric member 10 which is essentially ring shaped and dimensioned to fit within the annular space for which it is intended. Thus, the distance between the radial inner and outer faces 12, 14 respectfully will be slightly less then the corresponding distance in the double-walled pipe structure.

The longitudinal and faces 16, 18 are formed into a concave V-profile. Adjacent the concave V-profile are ring-shaped steel compression members 20, 22, the internal faces of which are formed with a convex V-shape corresponding to the shape of the longitudinal faces 16, 18 of the elastomeric member 10. However, the angle of the concave V-section of the elastomeric member 10 is slightly more acute than the angle of the convex V-shape of the compression members 20, 22.

At intervals around the ring-shaped compression members 20, 22, a through hole 24 is formed in the member 22, aligned with a through hole 26 in the elastomeric member 10 and a blind hole 28 in the other compression member 20. The blind hole 28 is internally threaded. A bolt 30 is passed through the hole 24 in the compression member 22, through the hole 26 in the elastomeric member 10, and is received in the thread of the blind hole 28. Tightening of the bolt therefore urges the compression members 20, 22 together, provided longitudinal compression to the elastomeric member 10. This, in combination with the differentiation of the angles of the respective concave and convex formations, forces the radial faces 12, 14 of the elastomeric member 10 outwardly. This provides a suitable seal against the flow within the pipes (not shown).

Figure 2:
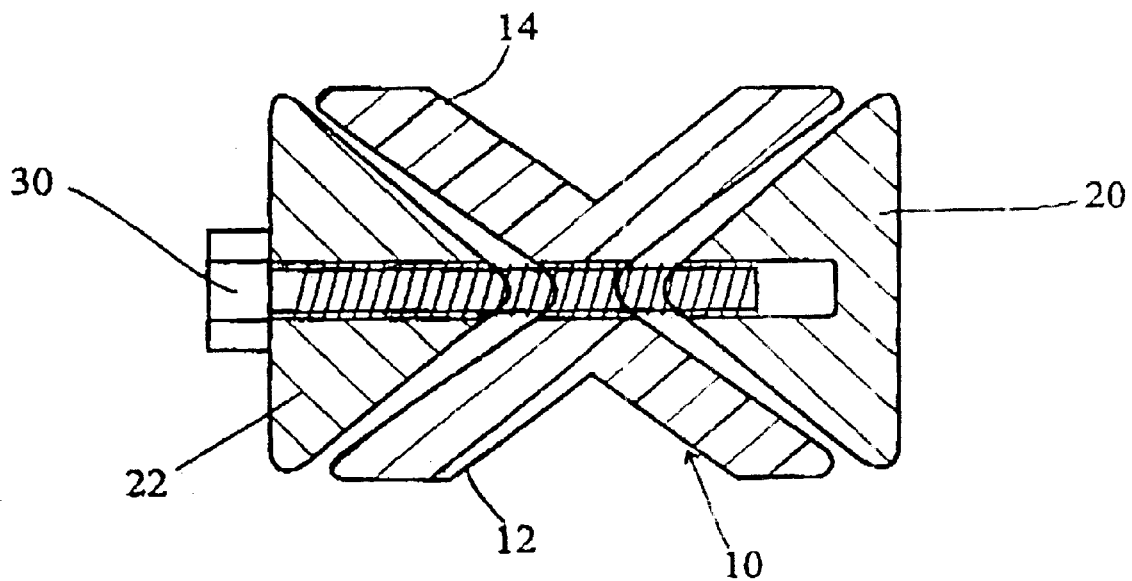
FIG. 2 is a cross-section, through a second embodiment of the present invention.

FIG. 2 shows a second embodiment of the present invention. It is generally similar to FIG. 1, and therefore like reference numerals are used to denote like parts. In FIG. 2, the radial faces 12, 14 of the elastomeric member 10 are formed with corresponding concave formations. As illustrated, these are simple V-formations but this is not essential and a more rounded profile could be provided if desired.

These concave formations impart additional flexibility to the elastomeric member 10 and thus magnify the radial movement of the elastomeric material. Thus, this design may be more suitable for still narrower annular gaps.

Figure 3:
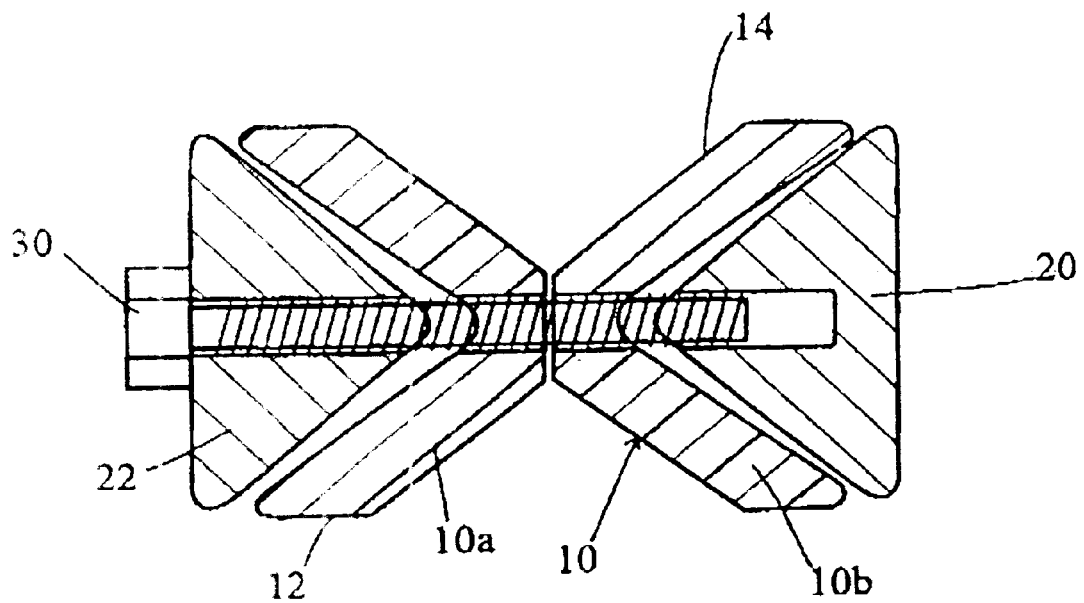
FIG. 3 is a cross-section through a third embodiment of the present invention.

FIG. 3 shows a third embodiment of the present invention, generally similar to the second. In this embodiment, the elastomeric member 10 is divided into two segments 10a, 10b at the narrowest point of the concave segments of the radial faces 12, 14. Such a configuration may be easier to manufacture and assemble.

This variation on the second embodiment could of course be applied equally to the first embodiment.

Figure 4:
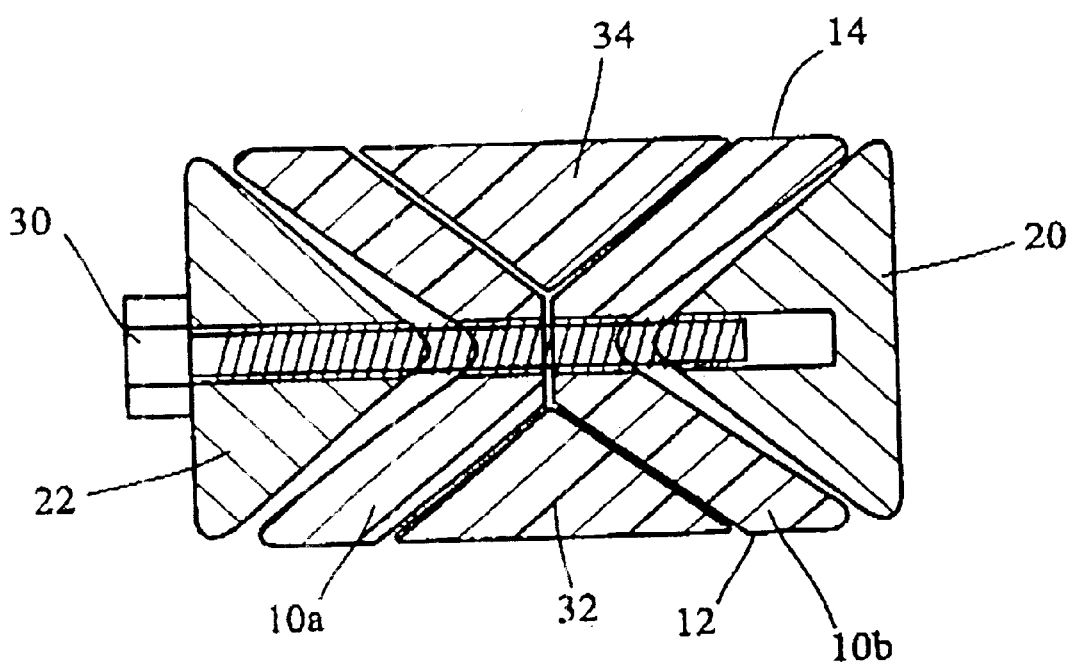
FIG. 4 is a cross-section through a fourth embodiment of the present invention.

FIG. 4 shows a fourth embodiment of the present invention, generally similar to the third but in which additional filler members 32, 34 are placed in the concave spaces formed in the radial faces 12, 14. This arrangement will operate generally similarly to the second embodiment, with similar advantages, and could equally be applied to the second embodiment rather than to the third as illustrated. Compression of the elastomeric members 10a, 10b should cause the outer filler member 34 to expand in the hoop direction and be compressed against the sleeve pipe. Likewise, the inner filler member 32 Will be compressed in the hoop direction and compressed against the flow pipe. Sealing between the filler members 32, 34 and the elastomeric members 10a, 10b will be by longitudinal compression along the adjacent faces, caused by the bringing together of the compression members 20, 22.

Figure 5:
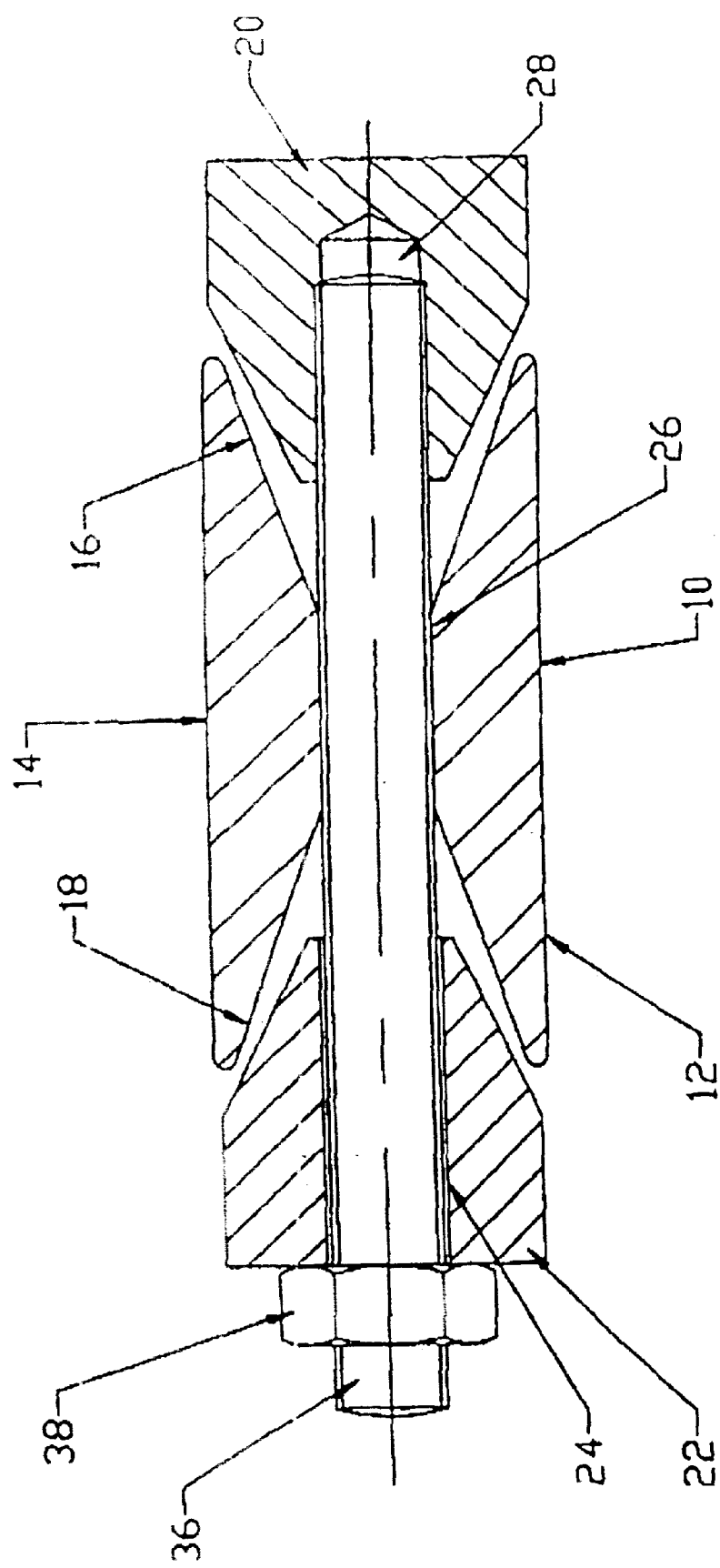
FIG. 5 is a cross-section through a fifth embodiment of the present invention.

FIG. 5 show a fifth embodiment of the invention. It is generally similar to the first embodiment, and therefore correlated reference numerals have been employed. The dimensions in the radial and longitudinal direction have been adjusted to take account of the dimensions of the intended use, but this does not affect the principle of the device. Thus, the elastomeric member when uncompressed has an aspect ratio of 6.8 and the concave V-section includes and angle of 38°. This offers a more secure seal within the narrow confines to which the present invention relates. In general, an aspect ratio of greater than 6 is desirable, although if above 10 the design becomes unwieldy. Likewise, an included angle of between 45° and 30° is desirable.

This embodiment also differs in that the bolt 30 of the first embodiment is replaced with a length of threaded studding 36. This passes (as before) through the hole 24 in the compression member 22, through the hole 26 in the elastomeric member 10, and is received in the blind hole 28. A nut 38 is provided on the free end of the studding 36, tightenable against the compression member 22 to bring the compression members 20, 22 together.

It will thus be appreciated that the present invention offers a seal for use in a variety of annular widths which can provide sufficient sealing. Examples generally according to the first embodiment have been tested and have withstood a water pressure of 59 bar, without leakage.

It will be appreciated that many variations can be made to the above-described embodiments, without departing from the scope of the present invention. For example, the changes as between the embodiments of FIGS. 1 to 4 could likewise be applied to the embodiment of FIG. 6. All such embodiments are intended to be encompassed by the present application.

What is claimed is:

1. A gasket for sealing an annular space between two pipes, comprising an annular elastomeric member having a concave formation, at least one steel compression member adjacent each longitudinal end face connected via a plurality of threaded members passing through at least one of the compression members and through the elastomeric member, the threaded members being adapted to urge the compression members together, the at least one compression member adjacent a concave formation on the elastomeric member including a corresponding convex formation, in which the threaded members extend into an internal threaded blind hole in one of the compression members.

2. A gasket according to claim 1, in which the elastomeric member is unitary.

3. A gasket according to claim 1, in which the elastomeric member also includes a concave formation on at least one radial face.

4. A gasket according to claim 3, which the gasket further includes at least one filler member in the concave formation on the radial face.

5. A gasket according to claim 4, in which the filler member is elastomeric.

6. A gasket according to claim 1, in which the threaded members are bolts.

7. A gasket according to claim 1, in which the threaded members pass through both compression members and are retained by at least one nut.

8. A gasket according to claim 1, in which the steel compression members are unitary.

9. A gasket according to claim 1, which the steel compression members are divided into a plurality of individual arcuate members.

10. A gasket according to claim 9, in which individual arcuate portions on either side of the elastomeric member are staggered.

11. A gasket according to claim 1 in which the aspect ratio of the elastomeric member when uncompressed is greater than 6.

12. A gasket according to claim 1 in which the aspect ratio of the elastomeric member when uncompressed is less than 10.

13. A gasket according to claim 1 in which the aspect ratio of the elastomeric member when uncompressed is about 6.8.

14. A gasket according to claim 1 in which the concave formation of the elastomeric member when uncompressed includes an angle of less than 45°.

15. A gasket according to claim 1 in which the concave formation of the elastomeric member when uncompressed includes an angle of greater than 30°.

16. A gasket according to claim 1 in which the concave formation of the elastomeric member when uncompressed includes an angle of about 30°.

* * * * *